(12) United States Patent
Seaman et al.

(10) Patent No.: US 7,102,670 B2
(45) Date of Patent: Sep. 5, 2006

(54) BOOKMARKING CAPTURED DIGITAL IMAGES AT AN EVENT TO ALL PRESENT DEVICES

(75) Inventors: Mark D. Seaman, Greeley, CO (US); Gregory A. Brake, Fort Collins, CO (US); Robert D. Thompson, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 10/001,585

(22) Filed: Oct. 31, 2001

(65) Prior Publication Data

US 2004/0201685 A1    Oct. 14, 2004

(51) Int. Cl.
*H04N 5/76* (2006.01)
(52) U.S. Cl. .............................. 348/231.6; 348/231.2; 348/231.5
(58) Field of Classification Search ........... 348/211.11, 348/159, 157, 211.2, 211.3, 211.4, 207.1, 348/211.99, 231.6, 231.2, 231.5; 396/310; 382/115; 386/46
See application file for complete search history.

(56) References Cited

U.S. PATENT DOCUMENTS

| | | | |
|---|---|---|---|
| 4,183,056 A | | 1/1980 | Evans et al. |
| 5,296,884 A | * | 3/1994 | Honda et al. ............... 396/311 |
| 5,634,144 A | * | 5/1997 | Mauro et al. .................. 396/57 |
| 5,768,633 A | * | 6/1998 | Allen et al. ..................... 396/2 |
| 5,946,444 A | * | 8/1999 | Evans et al. ................... 386/46 |
| 6,337,951 B1 | * | 1/2002 | Nakamura .................... 396/57 |
| 6,396,537 B1 | * | 5/2002 | Squilla et al. ............... 348/239 |
| 6,526,158 B1 | * | 2/2003 | Goldberg .................... 382/115 |
| 6,636,158 B1 | * | 10/2003 | Bando et al. .......... 340/825.49 |
| 6,750,902 B1 | * | 6/2004 | Steinberg et al. ........ 348/211.3 |
| 2002/0101519 A1 | * | 8/2002 | Myers ........................ 348/232 |

FOREIGN PATENT DOCUMENTS

| | | |
|---|---|---|
| WO | WO 99/53686 A1 | 10/1999 |
| WO | WO 99/63686 | 12/1999 |
| WO | WO 01/20489 * | 3/2001 |

OTHER PUBLICATIONS

Amended Search Report dated Mar. 24, 2003.

* cited by examiner

*Primary Examiner*—Tuan Ho
*Assistant Examiner*—Gary C. Vieaux

(57) ABSTRACT

An event bookmarking device detects input signals corresponding to events of interest, generates event bookmarks in response to receiving the input signals so that the event bookmark identifies the event of interest, and broadcasts the event bookmarks. An image capture device detects the broadcasted event bookmarks, captures images of interest, and associates the captured images with the detected event bookmarks. An image data manager collects the captured images from at least one image capture device, receives a specified event bookmark, and identifies from the plurality of captured images those captured images that correspond to the specified event bookmark. An alternative embodiment of the event bookmarking device generates and stores an event bookmark with a time. An image capture device provides images with time stamps. An image data manager identifies captured images that correspond to the specified event bookmark based upon the time stamps and the event bookmark time.

29 Claims, 5 Drawing Sheets

BOOKMARKING CAPTURED DIGITAL IMAGES AT AN EVENT TO ALL PRESENT DEVICES

BACKGROUND OF THE INVENTION

1. Field of the Invention

The present invention generally relates to capturing and processing digital images and, in particular, to a system and method for bookmarking digital images.

2. Related Art

With the advent of digitally-based image capturing devices capable of "photographing" an image and providing the image in a digital data format, a digital "photograph" of the image may be processed using computer systems that execute logic configured to manipulate the digital data corresponding to the image. Such computer systems include readily available commercial processors, such as the well-known personal computer (PC), or proprietary processing systems specially dedicated to the processing of digital images.

For example, an individual may capture still images of a special event, such as a wedding, using a commercially available digital camera. The individual typically would, at a later time, process the image on their PC using a commercially-available digital image processing program. The individual would download the images captured and stored in the digital camera into the PC memory. The individual then selectively orders the images, such as in a time sequence or event occurrence sequence. Also, the individual may optionally perform various image processing functions, such as, but not limited to, resizing the image, adding borders to the image, cropping out portions of the image, adding meta-data to the image, etc. After the digital images have been downloaded to the PC memory, and processed if desired, one or more images may be transmitted to others via e-mail or uploaded onto another media, such as a floppy disk.

If, for example, at the wedding, several individuals captured digital still images, each using their own digital still camera, the individuals could choose to download all of the captured digital images (or selected images) into the memory of one PC. Then, the group of digital still images could be processed as a coherent grouping of images to memorialize the wedding. Such a coherent grouping of still images could then be published into a wedding album or e-mailed to others for viewing.

However, processing the aggregation of the many digital still images, particularly when the images are captured by different individuals at different times using their own cameras, is a tedious, time-consuming manual process. The person processing the aggregation of digital still images typically would, at some point in the process of creating the desired coherent grouping of images, time order the images and/or order the digital still images according to event occurrences. For example, the person may manually select all digital still images of the bride walking down the aisle, and then arrange in a time order each of the selected digital still images. Then, the most desirable images of the bride walking down the aisle could be selected to best memorialize that portion of the wedding.

Unfortunately, such a process of selecting all of the relevant digital still images from a large data base of digital still images, and then time ordering the digital still images, requires a considerable amount of time and concentration on the part of the person processing the digital still images. Furthermore, the process is subject to a great degree of error in that the digital still images may not be correctly sequenced. Also, some digital still images may be inadvertently omitted during the initial identification and selection of images memorializing the predefined occurrence when there are a great number of images to consider, and/or if the visual queues associating the digital still image(s) to the predefined occurrence are not readily discernible to the person organizing the images.

Furthermore, digital image capturing and processing technology has advanced such that image capturing devices are able to capture video information. For example, a plurality of digital video capturing devices are typically used to capture images of a special event, such as a football game, using commercially available video cameras or specially fabricated digital motion picture cameras. When the digital video images are rapidly processed for a television broadcast of the football game, the ability to quickly identify and retrieve specific images, video or still, associated with a predefined occurrence in the event, such as a touchdown, is desirable.

For example, the broadcaster may desire to compare the just-completed touchdown by a famous player with a video clip of similar touchdown made by that player in a game three weeks ago. Finding, and then retrieving, the video clips of the two touchdowns must be made accurately and quickly if such video clips are to be useful to the viewing audience.

SUMMARY OF THE INVENTION

The present invention overcomes the inadequacies and deficiencies of the prior art discussed hereinabove. Generally, the present invention, an event broadcaster, image capture device and image data manager system, provides a system and method for processing captured images.

An event bookmarking device according to the present invention detects an input signal corresponding to an event of interest, generates an event bookmark in response to receiving the input signal so that the event bookmark identifies the event of interest, and broadcasts the event bookmark. An image capture device detects the broadcasted event bookmark, captures an image of interest, and associates the captured image of interest with the detected event bookmark. An image data manager collects a plurality of captured images from at least one image capture device, receives a specified event bookmark, and identifies from the plurality of captured images those captured images that correspond to the specified event bookmark.

In an alternative embodiment in accordance with the present invention, an event bookmarking device detects an input signal corresponding to an event of interest, generates an event bookmark with a time in response to receiving the input signal so that the event bookmark identifies the event of interest, and stores the event bookmark and associated time in a memory. An image capture device captures an image of interest, and associates the captured image of interest with a time stamp. An image data manager collects a plurality of captured images with time stamps from at least one image capture device, collects the event bookmark and associated time, receives a specified event bookmark, and identifies from the plurality of captured images those captured images that correspond to the specified event bookmark.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

In general, the present invention relates to a system and method for providing event bookmark information to one or more digital imaging capturing devices, such as a digital camera that captures still and/or video images, and for the subsequent processing of the captured images into a coherent grouping of images to memorialize the event. Hereinafter, the term image refers to digital still and/or video information. In one embodiment, event bookmark information comprises information corresponding to time, hereinafter referred to as a time stamp, and/or information corresponding to the event, hereinafter referred to as the event marker. After the conclusion of the event (or when the photographers conclude the process of capturing the images) the images are downloaded into a memory for additional processing, as described below. Such processing comprises time ordering of the images and/or ordering of the images according to a predefined occurrence in the event.

Figure 1:
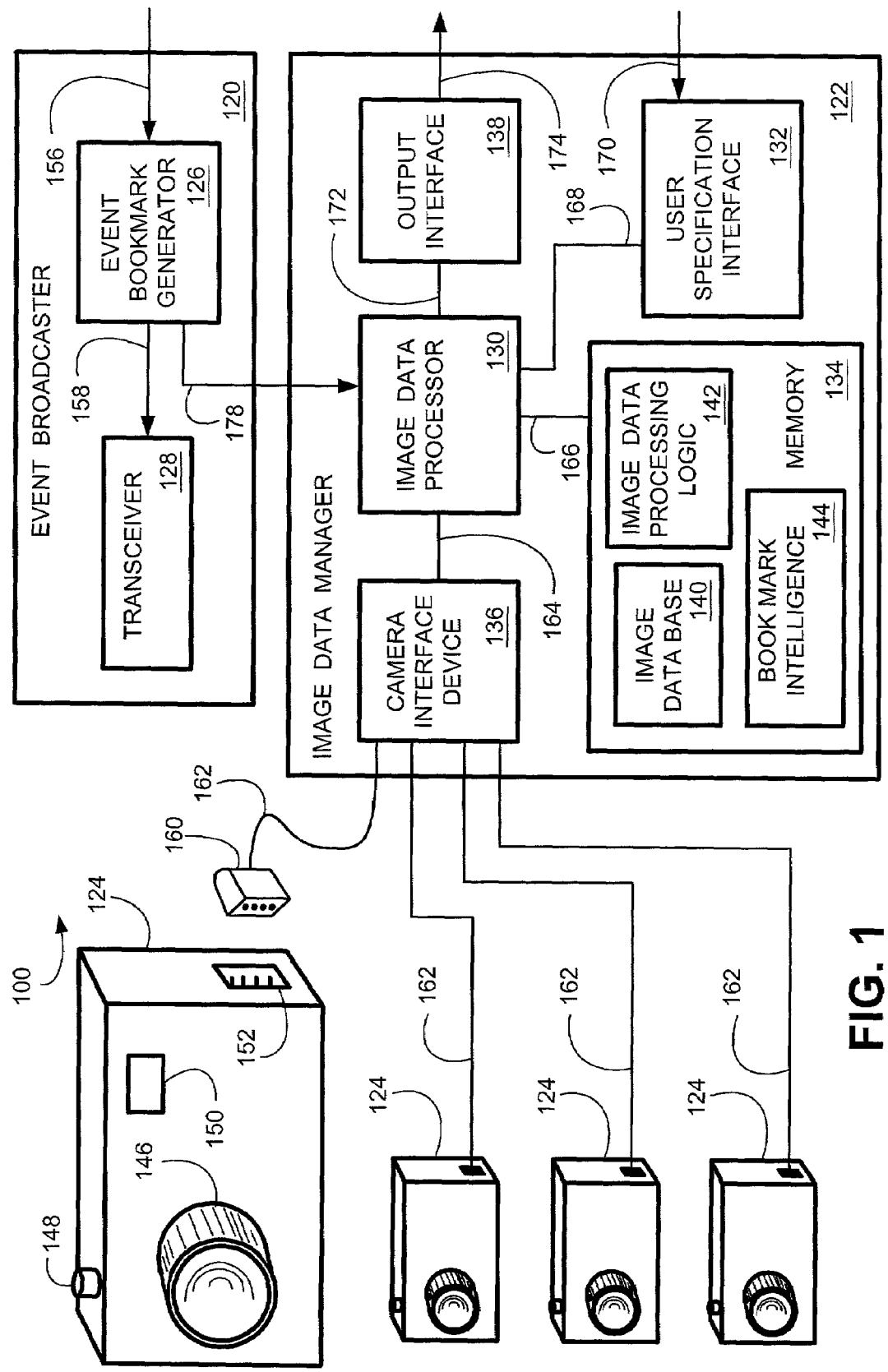
FIG. 1 is a block diagram illustrating an embodiment of an event broadcaster and an image data manager according to the present invention.

FIG. 1 is a block diagram illustrating an embodiment of an event broadcaster and image data manager system 100, according to the present invention, comprising an event broadcaster 120 and an image data manager 122 in communication with a plurality of digital image capture devices 124. Event broadcaster 120 comprises an event bookmark generator 126 and a transceiver 128. Image data manager 122 comprises at least an image data processor 130, a user specification interface 132, a camera interface device 136, a memory 134, and an output interface 138. Memory 134 comprises portions of the memory structure dedicated for data corresponding to the captured images that reside in the image database 140, image data processing logic 142 for processing the images, and bookmark intelligence 144 logic for identifying and associating the event bookmarks and the images.

For convenience of illustrating an image capture device in FIG. 1, the digital image capture device(s) 124 are illustrated as a generic version of a digital camera typically used to capture digital still images. For ease of discussion, digital image capture device(s) 124 may also be referred to as digital camera(s) 124 [plural and/or singular] through this disclosure. However, digital cameras 124 according to the present invention comprise additional internal components for receiving an event bookmark and for associating a received event bookmark with a "photograph" image. The additional components are described in detail below. Such digital cameras 124 comprise a lens unit 146, an image capture actuation button 148, a viewing lens 150 and a plug-in interface 152. Lens unit 146 is used for the focusing of the image prior to the "photographing" of the image. When the operator (not shown) has focused the image to be captured and is satisfied with the nature of the image that will be captured by digital cameras 124, the operator actuates the image capture actuation button 148 to cause the digital cameras 124 to capture a digital image, thus "photographing" the image. Detailed operation of these above-described individual components residing on the digital cameras 124 are not described in detail herein other than to the extent necessary to understand the operation and functioning of these components when employed as part of an event broadcaster and image data manager system of the present invention.

Digital cameras 124, or other digitally-based image capture devices, also have additional components not shown in FIG. 1. Such components are not discussed herein as such components are not necessarily relevant to the operation of a digital cameras 124 when employed with an event broadcaster and image data manager system of the present invention. Furthermore, for convenience of illustration, digital cameras 124 are illustrated from a perspective that shows only the front, top and one side view of digital cameras 124. Digital cameras 124 have additional components residing on the hidden sides of the digital cameras 124 not illustrated or discussed herein as such components are not necessarily relevant to the operation of a digital cameras 124 when employed with an event broadcaster and image data manager system of the present invention. However, such components will be described below should such components (not shown) become relevant to the discussion of the operation of a digital cameras 124 with respect to an event broadcaster and image data manager system of the present invention.

Furthermore, for convenience of illustration and explanation of the operation and functionality of an event broadcaster and image data manager system of the present invention, the appearance of the digital cameras 124 indicates that the digital cameras 124 are particularly suited for the capturing of digital still images. However, such a digital camera 124 is easily adapted to capture digital video images. Furthermore, it is intended that an event broadcaster and image data manager system of the present invention perform well with other types of digital image capture devices (not shown) such as, but not limited to, a digital video camera or a digital motion picture camera, and is intended to be within the scope of this disclosure.

Figure 2:
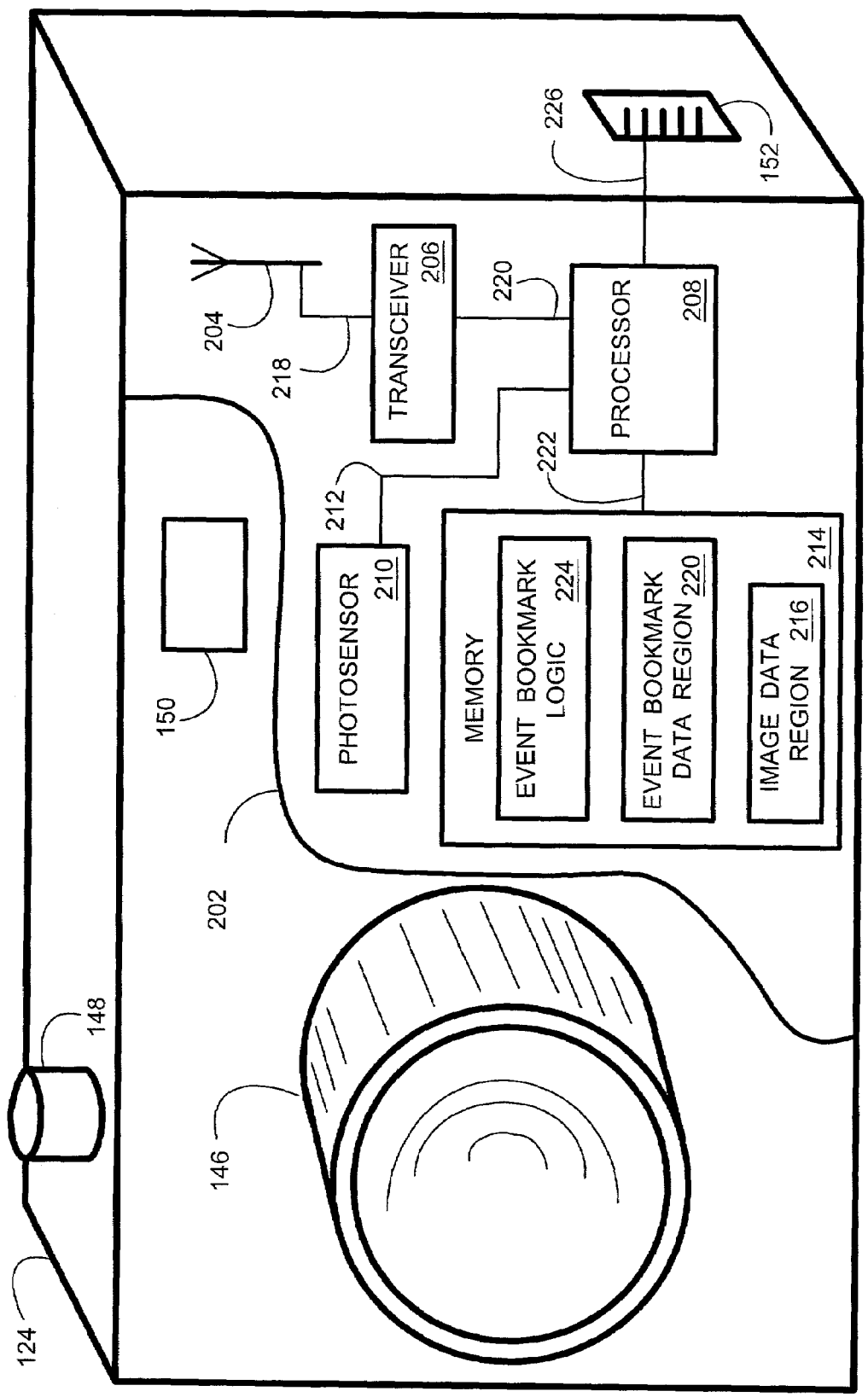
FIG. 2 is a block diagram illustrating an embodiment of selected internal components residing in a digital camera that are configured according to the present invention to communicate with the event broadcaster and image data manager system of FIG. 1.

FIG. 2 is a block diagram illustrating selected internal components residing in the digital cameras 124 that are configured to communicate with the event broadcaster and image data manager system 100 (FIG. 1). A cut-away line 202 demarks components residing on the outside surfaces of digital cameras 124 and components residing internally in digital cameras 124. Thus, lens unit 146, image capture actuation button 148, viewing lens 150 and plug-in interface 152 are recognized as components residing on the surface of digital cameras 124.

Internal components of digital cameras 124 comprise an antenna 204, a transceiver 206 and a processor 208. Processor 208 is configured to receive communication signals from transceiver 206, as described below. Like a conventional digital camera or digital image capturing device, digital cameras 124 captures the digital image to be captured on photosensor 210. When the user actuates the image capture actuation button 148, the image detected by photosensor 210 is received by processor 208, via connection 212, and stored in memory 214 in the image data region 216. Photosensor 210, processor 208 and memory 214 are conventional components employed in the art of capturing digital images. Furthermore, one skilled in the art will realize that a digital camera or other digital image capture device 124 may have the components shown in FIG. 2 connected in a different order and manner than shown, or may not include all of the components shown, or may include additional components connected in some other manner with the components shown without affecting the operation of the digital cameras or another digital image capture device 124 without adversely affecting the operation and functionality of the digital cameras 124 when operated as part of an event broadcast and image data manager system 100 according to the present invention. Any digital camera or a similarly configured digital image capture device is intended to be within the scope of this disclosure.

Operation and functionality of the event broadcaster 120 is now described with reference to FIGS. 1 and 2. In one embodiment, the event broadcaster 120 is a portable stand-alone device, that is located in proximity to the event that is to be captured by the individual(s) operating the plurality of digital cameras 124. As the event progresses, an operator of the event broadcaster 120 prompts the event broadcaster 120 to transmit an event bookmark at a selected occurrence or at selected times during the event. The operator provides a suitable input signal to the event bookmark generator 126, via connection 156. Event bookmark generator 126 generates an event bookmark signal that comprises event information, described in greater detail below.

The event bookmark is provided to transceiver 128, via connection 158, for broadcasting out to the plurality of digital cameras 124. The event bookmark signal broadcasted by transceiver 128 is broadcasted with sufficient signal strength so that the digital cameras 124 used to "photograph" the event receive the broadcasted event bookmark signal. Antenna 204 (FIG. 2) in each of the cameras 124 detects the broadcasted event bookmark signal and provides the detected signal to transceiver 206, via connection 218. Transceiver 206 amplifies and/or processes the detected event bookmark signal and provides a suitable signal to processor 208 over connection 220. Processor 208 further processes the event bookmark signal, if necessary, and then transmits the processed event bookmark signal to memory 214 for storage in the event bookmark data region 220. Processor 208 accesses memory 214 via connection 222. Such additional processing of the event bookmark signal by processor 208 would be effected by executing the event bookmark logic 224 residing in memory 214.

In one embodiment, as the user of a digital camera 124 initiates the capturing of an image by photosensor 210, processor 208 preferably associates the incoming data corresponding to the captured digital image with the most recent event bookmark that has been stored in the event bookmark data region 220 by executing the event bookmark logic 224.

As described above, an operator of the event broadcaster 120 (FIG. 1) preferably prompts the event bookmark generator 126 to generate an event bookmark. Alternatively, the event bookmark is generated on a periodic basis, such as a clocking signal from a clock device (not shown). Yet another embodiment may be coupled to another device (not shown) that is monitoring the event such that an event bookmark is generated upon prompting by the other device. The generated event bookmark is sent to transceiver 128 for broadcasting to the one or more digital cameras 124. In one embodiment, transceiver 128 broadcasts a signal corresponding to the event bookmark out to the plurality of digital cameras 124.

Antenna 204 (FIG. 2) residing in each one of the digital cameras 124 detects the incoming signal having the bookmark information and provides the detected signal to transceiver 206. Transceiver 206 further processes the incoming signal and provides a suitable signal, via connection 220, to processor 208. Processor 208 then processes the received signal containing the event bookmark information into a signal suitable for storing in the event bookmark data region 220 of memory 218. An alternative embodiment of digital cameras 124 employ a processor 208 or similar functioning state machine that immediately associates the received event bookmark with the digital image. Such an alternative embodiment would be particularly applicable to a digital image capture device capturing video images.

The transceiver 128 residing in the event broadcaster 120 is implemented using components and methods employed in the art of transmitting communication signals, and in particular, transmitting radio frequency (RF) or other suitable electromagnetic communication signals. Likewise, antenna 204 and transceiver 206 residing in each one of the digital cameras 124 are implemented using components and methods employed in the art of receiving communication signals. In an alternative embodiment, antenna 204 resides outside of the transceiver 206. In another embodiment, antenna 204 resides outside of the digital camera 124. In yet another embodiment, transceiver 206 transmits an optical and/or infrared bookmark signal, using a suitably configured optical and/or infrared transmitter, such that the optical and/or infrared bookmarks are received by suitably configured optical and/or infrared sensors residing in the digital cameras or coupled to the exterior of the digital cameras.

Detailed operation of transceiver 128, antenna 204 and transceiver 206 are not described in detail herein, other than to the extent necessary to understand the operation and functioning of these components when employed as part of the event broadcaster and image data manager system 100. One skilled in the art will realize that transceiver 128, antenna 204 and transceiver 206, or other suitable communication devices, may be implemented in the event broadcaster and image data manager system 100 according to the present invention, and that such communication devices are too numerous to conveniently describe in detail herein.

In one embodiment, an event bookmark transmitted by the event broadcaster 120 to each one of the digital cameras 124 comprises at least a time stamp corresponding to the time that the operator of the event broadcaster 120 initiated the broadcasting of the event bookmark. Such a time stamp in one embodiment corresponds to real time. In another embodiment, the time stamp corresponds to a time unit referenced to a base time. For example, the base time may be defined as the start of the event (beginning of the wedding ceremony) and the time stamp associated with the bride walking down the aisle would correspond to a unit of time between the base time and the time that the operator of the event broadcaster 120 initiated the broadcast of the event bookmark.

Other embodiments of the event broadcaster 120 provide for the incorporation of meta-data into the event bookmark. Meta-data is defined herein to include any type of information, including time-related information, that is incorporated as part of the event bookmark. Such meta-data is used to facilitate the process of creating a desired coherent grouping of images and/or to identify a particular still image or video clip according to a predefined occurrence in the event. For example, the operator of the event broadcaster 120 may instruct the event bookmark generator 126 to generate an event bookmark corresponding to the bride walking down the aisle. Generation of such an event bookmark associated with this occurrence (bride walking down the aisle) may be implemented in a variety of manners. For example, a predefined sequence of alphanumeric characters may be associated with known occurrences that are to be anticipated during the event at which images are captured by the plurality of digital cameras 124. For example, the numeral 1 (or letter A) could be associated with the start of the wedding. The numeral 2 might be associated with the occurrence corresponding to the arrival of the groom at the alter. The numeral 3 might be associated with the start of the bride walking down the aisle. Other occurrences during the wedding could be assigned alphanumeric codes. As the event progresses through the sequence of anticipated occurrences, the operator of the event broadcaster 120 actuates an actuating device (not shown) such as a push button or the like to prompt the event bookmark generator to generate an event bookmark having the associated alpha-numeric identifier included as part of the event bookmark. Thus, as the event progresses, the operator of the event broadcaster 120 merely prompts the event bookmark generator 126 to generate the event bookmark at the desired times.

Alternatively, another embodiment of the event broadcaster 120 may employ a keyboard device (not shown), a touch pad device, a touch screen device or the like coupled to connection 156 such that the operator of the event broadcaster 120 may customize a meta-data message incorporated into the event bookmark. For example, the event broadcaster would type in "groom at alter" and then prompt the event bookmark generator 126 to generate an event bookmark having the entered text to thereby broadcast the event bookmark designating that the groom is at the alter. Likewise, the operator of the event broadcaster 120 might enter the phrase "bride walking down aisle" into the event broadcaster 120, and at the desired moment, prompt the event bookmark generator 126 to generate and broadcast an event bookmark having the phrase "bride walking down aisle" to each of the digital cameras 124. One skilled in the art will appreciate that this embodiment is particularly useful in providing flexibility to the operator of the event broadcaster 120 so that any number of occurrences during the event may be uniquely identified with a relevant phrase and/or other pertinent information. Accordingly, when the plurality of images captured by the plurality of digital cameras 124 are combined into a large database, the operator of the image data manager 122 processing the images may easily locate and identify all images that have been bookmarked with an event bookmark containing the phrase and/or information of interest.

Another embodiment of the event broadcaster and image data manager system 100 employs a specially-dedicated clock 406 (FIG. 4), or another clocking device residing in the digital cameras 124, to provide a time stamp which is incorporated with the event bookmark. For example, the operator of the event broadcaster 120, at the appropriate time, would prompt the event bookmark generator 126 to generate an event bookmark that is associated with the start of the bride walking down the aisle. The event bookmark would be broadcasted to each one of the digital cameras 124. As "photographs" are taken with digital cameras 124, the special dedicated clock or other clocking device 406 (FIG. 4) provides a time stamp signal to processor 208 (FIG. 2). Processor 208 then associates the time stamp and the event bookmark with the image through the execution of the event bookmark logic 224, and saves the resulting bookmarked image data into the image data region 216 of memory 214.

When the individuals have completed the process of capturing images of the event with their respective digital cameras 124, typically at the conclusion of the event, the images residing in the image data region 216 of memory 214 in each of the cameras 124 are aggregated together in a common database. In some situations, only one individual may by capturing images using one or more digital cameras 124.

Once the images have been aggregated into the database, an operator of the image data manager 122 processes the aggregation of images in a desired sequence and/or manner by gathering and manipulating the images having a common event bookmark, as described below. Furthermore, additional images from digital cameras 124 may be downloaded into the image database 140 at any time during the processing of the aggregation of images.

For example, if four cameras are used to capture the wedding, and the individual capturing images with the fourth digital cameras 124 leaves before the conclusion of the wedding, the digital images residing in image data region 216 of the fourth digital camera 124 could then be transferred to the image database 140 at a convenient later time. That is, of the four digital cameras 124 illustrated in FIG. 1, digital image data from three of the four digital cameras 124 might be downloaded after the conclusion of the wedding into the image database 140. An operator of the image data manager 122 could then begin processing the aggregation of images. Then, data from the fourth digital camera 124 can be later added to the image database 140. The operator would then be able to process images from the fourth digital camera 124 concurrently with and/or subsequent to the image data from the first three digital cameras 124.

The captured images may be downloaded from the digital cameras 124 employing a variety of techniques. One technique for downloading the images residing in the image data region 216 of memory 214 employs a conventional hard wire connection between the digital camera 124 and a camera interface device 136 residing in the image data manager 122. A suitably configured connector 160 is plugged into the plug-in interface 152 of the digital camera 124. Connection 162, coupled to the camera interface device 136 in any convenient and suitable manner, provides connectivity between the digital cameras 124 and the camera interface device 136. One embodiment of the camera interface device 136 comprises more than one of the connectors 160 so that the images residing in multiple digital cameras 124 are simultaneously downloaded.

When processor 208 is prompted to transfer the image information, processor 208 retrieves the stored image information from the image data region 216, via connection 222, and outputs the retrieved image information over connection 226. The image information is received by the camera interface device 136, and if necessary, processed into a suitable data format acceptable to the image data processor 130. Image data processor 130 accepts the suitably formatted image information over connection 164, and then transmits the image information in a suitable format for storage into the image database 140 residing in memory 134. Thus, image data processor 130 may be configured to reformat received image information into a suitable format.

Camera interface device 136, as described above, is in one embodiment, configured to receive images in any conventional data format provided by each one of the digital cameras 124. Such a feature is particularly desirable when the digital cameras 124 are produced by different vendors that employ different digital image data formats. One skilled in the art will appreciate that the camera interface device 136 may be implemented using components and techniques employed in the art of receiving image data. Any embodiment of a camera interface device configured to operate as a component of an image data manager according to the present invention, may be implemented without departing from the functionality and operation of the present invention.

Another technique that may be used to transfer the image information residing in a digital camera 124 (FIG. 1) to the image data manager 122 employs transceiver 206 (FIG. 2) to broadcast the image information using a suitable broadcast signal. When processor 208 is prompted to transfer the image information, processor 208 retrieves the stored image information from the image data region 216, via connection 222, and outputs the retrieved image information over connection 220 to transceiver 206. Transceiver 206 configures the received image information into a suitable format for broadcasting as a signal. The formatted signal is transmitted to antenna 204 and broadcasted out to transceiver 128 residing in the event broadcaster 120. Transceiver 128 processes the received signal containing the image information into a suitably formatted signal, and then transmits the processed image information to the image data processor 130 via connection 178. Image data processor 130 accepts the suitably formatted image information, and then transmits the image information in a suitable format for storage into the image database 140 residing in memory 134.

An alternative embodiment employs a memory element (not shown) and a processor (not shown) residing in the event broadcaster 120 (FIG. 1). The processor is configured to directly receive the image information from transceiver 128 and to store the received image information into the memory element. At a convenient later time, the stored image information may be transferred into the image data manager 122. Such an embodiment is particularly suitable to an embodiment of the event broadcaster and image data manager system 100 that employs at least one portable event broadcaster 120 that is taken to the event site and that employs a remote base station image data manager 122.

Other embodiments of the event broadcaster and image data manager system provide for alternative techniques of downloading image information into the image data manager 122. One embodiment provides an interface suitable for receiving information directly from the Internet via conventional data exchange interface systems, such as, but not limited to, conventional e-mail or the like. Another embodiment is configured to receive image information directly from a PC or other conventional memory storage device having a memory in which previously downloaded image information from the digital camera 124 has been downloaded to. Another embodiment is configured to receive image information from removable memory modules. Here, the removable memory module is typically coupled into the digital camera 124 for the storage of the images. Then, the removable memory module is decoupled from the digital camera 124 and coupled to the image data manager 122 to receive the stored image information. Yet another embodiment of the image data manager 122 is configured to receive image information from different types of recordable memory media, such as, but not limited to, floppy disks, zip disks, flash memory cards, hard disks, digital video disk (DVD), and compact disks. Another embodiment of the image data manager 122 is configured to receive the image information through an infrared receiver, an optical receiver, a microwave receiver, or the like.

For convenience of illustration in FIG. 1, and for convenience of explaining the operation and functionality of the event broadcaster and image data manager system 100, the event broadcaster 120 was illustrated as residing outside of the image data manager 122 as a separate, stand-alone device. In an alternative embodiment, the event broadcaster 120 and the image data manager 122 are incorporated together as a single unitary device. Such an embodiment is particularly advantageous in an application where the processing of the captured images is performed at the event site, either during the event itself or shortly after the conclusion of the event. Such an embodiment is preferably portable.

Processing of the image information residing in the image database 140 of memory 134 begins at any time after a plurality of images have been transferred from the digital cameras 124 into the image database 140, as described above. The operator of the image data manager 122, through user specification interface 132, provides instructions to the image data processor 130 specifying the event bookmarks of interest. User specification interface 132 is coupled to the image data processor 130 with connection 168.

Image data processor 130, executing image data processor logic 142 and/or bookmark intelligence 144, retrieves all of the images associated with the specified bookmark from the image database 140. Image data processor 130, in one embodiment, sequentially time orders the retrieved images. Following retrieval of the images associated with the specified bookmark, image data processor 130 provides a suitably formatted signal of the results of the image selection process to the operator of the image data manager 122.

The results of the image selection process described above may be communicated to the operator of the image data manager 122 in a variety of formats. In one embodiment, image data processor 130 transmits the selected images out to a viewing device (not shown) for viewing by the operator. Output interface 138 receives a signal corresponding to the selected images from the image data processor 130, via connection 172, and if necessary, reformats the received digital information into a suitable format usable by such viewing device, and then outputs the selected images to the viewing device via connection 174.

Output interface 138, as described above, may be optionally configured in one embodiment to process the image information received from the image data processor 130 into a variety of suitable formats required by the particular device to which the output interface 138 is coupled. For example, but not limited to, the output interface 138 would provide suitably formatted information for a PC monitor (not shown) when the PC monitor is coupled to connection 174. When a printing device is coupled to connection 174, the output interface 138 would provide a suitably formatted signal to the printing device. Other non-limiting examples of output devices which the output interface 138 may be coupled to include flat panel display screens, photo printing devices, televisions, image archiving devices, and web-based services. This feature is particularly advantageous when the output interface 138 is configured to be coupled to a variety of output devices produced by different vendors that employ different data formats. Therefore, any embodiment of an output interface 138 configured to operate as a component of an image data manager according to the present invention, may be implemented without departing from the functionality and operation of the present invention.

Similarly, user specification interface 132, as described above, may be configured in one embodiment to receive the specification of the event bookmark of interest from the operator of the image data manager 122 by receiving information provided by a conventional input device (not shown) or from a specially fabricated input device (not shown). For example, but not limited to, user specification interface 132 may be configured to receive information from the operator of the image data manager 122 via a conventional keyboard device coupled to connection 170. Other examples of input devices include a conventional touch pad, touch screen, mouse, joy stick, rocker switches or other types of buttons. Such a feature is particularly advantageous when the input devices are produced by different vendors that employ different data formats. Therefore, any embodiment of the user specification interface 132 configured to operate as a component of an image data manager according to the present invention, may be implemented without departing from the functionality and operation of the present invention.

Figure 3:
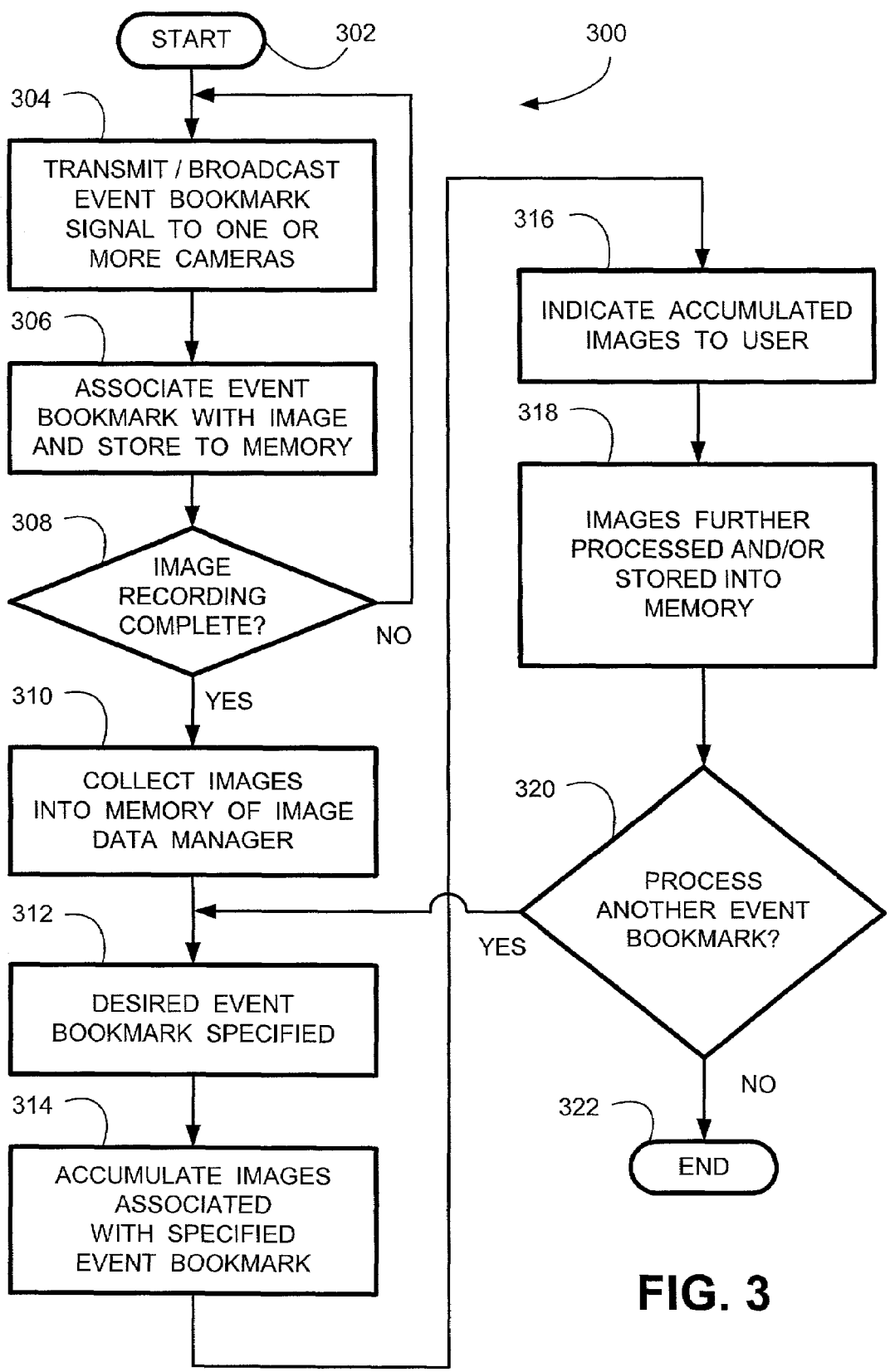
FIG. 3 is a flow chart illustrating a process of capturing and event bookmarking a plurality of digital still and video images and the subsequent processing of the images, all according to the present invention.

FIG. 3 is a flow chart 300, according to the present invention, illustrating an embodiment of a process of capturing and event bookmarking a plurality of images from digital cameras 124 (FIG. 1), and the subsequent processing of these images by the image data manager 122. The flow chart 300 of FIG. 3 also shows the architecture, functionality, and operation of a possible embodiment of the software for implementing the image data processing logic 142, and the associated bookmark intelligence 144. In this regard, each block may represent a module, segment, or portion of code, which comprises one or more executable instructions for implementing the specific logical function(s). In some alternative implementations, the functions noted in the blocks may occur out of the order noted in FIG. 3 or may include additional functions without departing from the functionality of the event broadcast and image data manager system 100. For example, two blocks shown in succession in FIG. 3 may in fact be executed substantially concurrently, the blocks may sometimes be executed in the reverse order, or some of the blocks may not be executed in all instances, depending upon the functionality of the embodiment involved, as will be further clarified hereinbelow. All such modifications and variations are intended to be included within the scope of the present invention.

The process of practicing the present invention, the event broadcast and image data manager system 100 (FIG. 1), starts at block 302. At block 304, in response to prompting by the operator of the event broadcaster 120 (FIG. 1), the event broadcaster 120 to transmits or broadcasts the event bookmark signal out to the digital cameras 124 (FIG. 1). At block 306, as images are captured by the individual(s) with a digital camera 124 (FIGS. 1 and 2), the digital image is associated with the event bookmark and saved in the image data region 216 (FIG. 2) of memory 214.

At block 308, a determination is made whether the image capturing session has been completed. That is, has the event concluded such that the individuals are no longer capturing images with at least one of the digital cameras 124 (FIG. 1)? Or, are the individuals done capturing images at the event although the event has not yet concluded? The cameras according to the present invention in one embodiment provide an indication signal indicating that the camera is no longer operating and/or receiving bookmark signals. For example, the camera may be turned off the camera shutter cover may be closed, or a suitable switching device may be actuated by the individual using the digital camera. Alternatively, the individuals at the event may understand that the image capturing session has been completed such that the process proceeds to block 310. Here, the operator of the event broadcaster 120 would then stop the transmission of event bookmarks.

If the image capturing session at block 308 has been completed (the YES condition), the process proceeds to block 310. At block 310 images are collected into the image database 140 (FIG. 1) of memory 134. Images from one or more digital cameras 124 are collected into the memory of the digital cameras. As described above, images may later be added from other digital cameras 124 that captured the event. For example, if four cameras are used to capture the wedding, and the individual capturing images with the fourth digital cameras 124 leaves before the conclusion of the wedding, the digital images residing in image data region 216 of the fourth digital camera 124 could then be transferred to the image database 140 at a convenient later time. Thus operator would process images from the fourth digital camera 124 concurrently with and/or subsequent to the image data from the first three digital cameras 124.

Furthermore, images from other sources, such as from digital cameras not configured to receive event bookmarks, and/or images residing in libraries of images or other suitable sources, may be added to the image data base 140. Here, block 310 is modified to include associating a selected event bookmark to each one of the added images from the other sources.

If one or more individuals are still capturing images at the event, or if the event is not yet over (the NO condition of block 308), the process returns to block 304 so that the event broadcaster 120 (FIG. 1) may transmit or broadcast additional event bookmark signals, if desired, to the digital cameras 124.

At block 312, a desired event bookmark is specified to the image data processor 130. Then, at block 314, image data processor 130 executes the image data processing logic 142 to accumulate the images associated with the specified event bookmark. At block 316, image data manager 122 indicates which images have been collected according to the specified event bookmark.

At block 318, in response to directions provided by the operator, further processing of the accumulated images is performed and/or images associated with the specified bookmark are stored, as desired, back into memory 134 (FIG. 1). At block 320, it is determined whether the image data manager 122 is to process additional images residing in the image database 140. If so (the YES condition), another event bookmark is specified and the process proceeds to block 312. If no further event bookmarks are to be processed (the NO condition), the process ends at block 322.

For example, a user may be required to process a large number of images ("photographs"). If the user's objective is to prepare a wedding album to memorialize the wedding ceremony in a time-ordered sequence, the user would specify to the image data manager 122 the event bookmark corresponding to the start of the wedding ceremony. For example, such an event bookmark could indicate the "seating of the wedding guests." Thus, image data processor 130 would execute the image data processing logic 142 (FIG. 1) to accumulate all of the images that were obtained after the time that the above-mentioned event bookmark was broadcast to the plurality of digital cameras 124 (FIGS. 1 and 2) up through the time that the next event bookmark was broadcast. Thus, all of the images accumulated would correspond to that portion of the wedding where the guests were seated.

In one embodiment, the accumulated images would be further time-sequenced based upon information provided by the clocking signal included as part of the event bookmark associated with each individual image. The operator of the image data manager 122 could then, in one embodiment, review all of the accumulated images associated with the event bookmark, "seating of the wedding guests," and select the most desirable images associated with that occurrence in the event.

Furthermore, the operator may elect to reorder the images in a more desirable order. For example, the operator may wish to further reorder the accumulated images according to the specific individuals photographed rather than according to a time-ordered sequence of images.

The operator of the image data manager 122 might then specify the next occurrence in the event or another occurrence of interest. For example, if the next occurrence in the event was the "arrival of the groom at the alter," the operator would specify to the image data manager 122 the event bookmark associated with that occurrence. The operator could then process the accumulated images associated with that event in a manner as described above. Thus, the operator of the image data manager 122 is able to quickly process an accumulation of images associated with a specified event bookmark with a high degree of accuracy and reliability.

Figure 4:
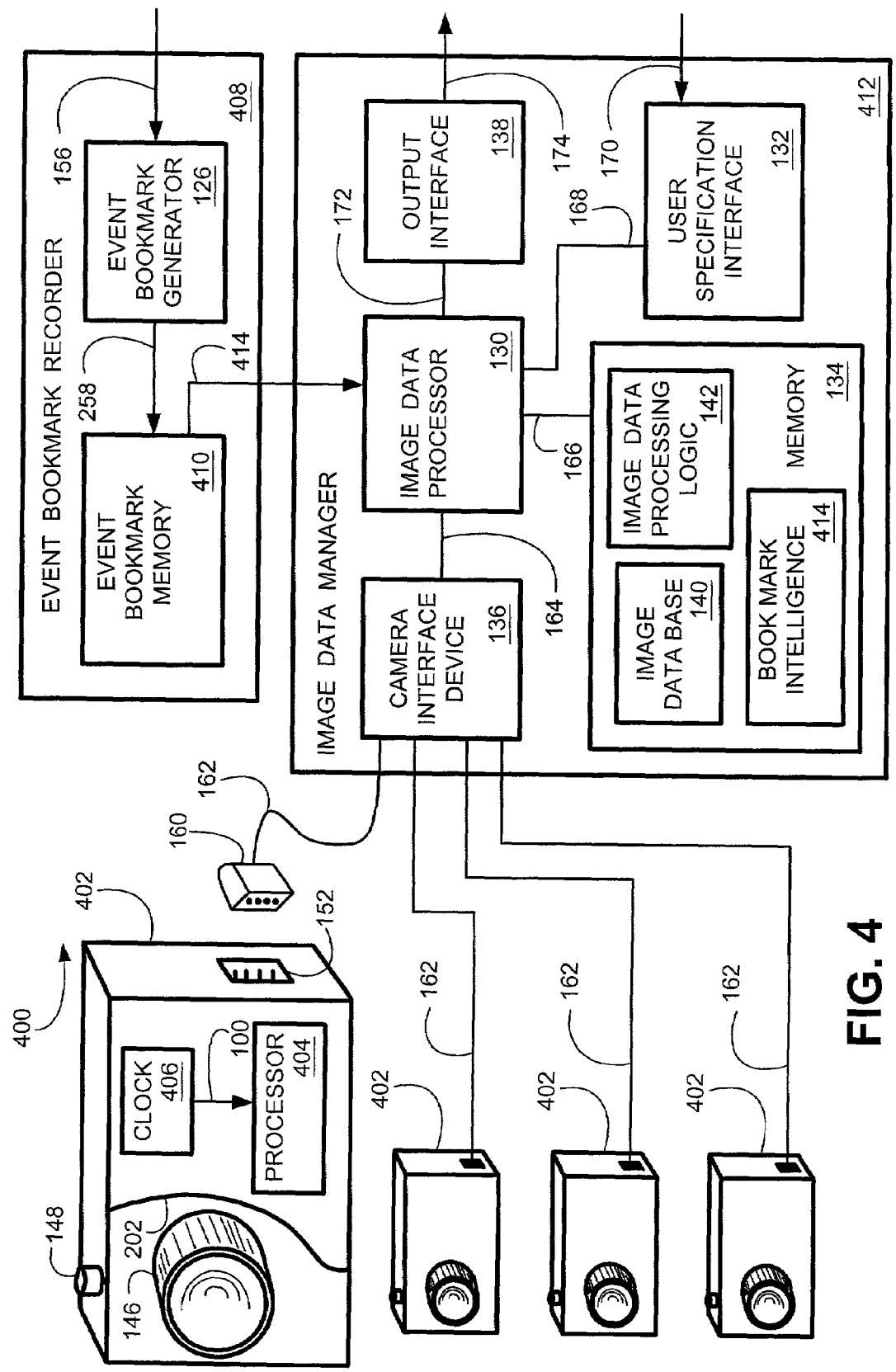
FIG. 4 is a block diagram illustrating an alternative embodiment of an event broadcaster and image data manager system according to the present invention.

FIG. 4 is a block diagram illustrating an alternative embodiment of the event broadcaster and image data manager system 400 in communication with a plurality of digital cameras 402. Digital cameras 402 are similar to the digital cameras 124 (FIGS. 1 and 2) in that many of the features and components are the same. For example, but not limited to, digital camera 402 comprises lens unit 146, image capture actuation button 148 and plug-in interface 152. The functionality and operation of these components are described above. A cut-away line 202 demarks components residing on the outside surfaces of digital cameras 402 and components residing internally in digital cameras 402. However, in contrast to the digital cameras 124 (FIG. 1), digital cameras preferably 402 each include at least a processor 404 and a clock 406. As a photosensor 210 (FIG. 2) captures an image and transmits the image to processor 404, clock 406 provides a time stamp to processor 404. Processor 404 associates the received time stamp with the incoming image information from photosensor 210 by executing the event bookmark logic 224 (FIG. 2). Processor 404 is coupled to a memory 214 (FIG. 2) so that the incoming image and associated time stamp may be stored in the image data region 216 (FIG. 2). Photosensor 210 and memory 214 are coupled to processor 404 with connections (not show) in a similar manner as in FIG. 2.

An event bookmark recorder 408 employs an event bookmark memory 410. An operator of the event bookmark recorder 408 prompts the event bookmark generator 126 to generate an event bookmark. The generated event bookmark is stored in the event bookmark memory 410. As described above, a variety of input signals may be supplied to the event bookmark generator 126, via connection 156, to customize information contained in the event bookmark.

During the event, the generation of an event bookmark is stored in the event bookmark memory 410 during occurrences of interest during the event. When the individual(s) has completed the process of capturing the event with their respective digital cameras 402, typically at the conclusion of the event, the images residing in the image data region 216 (FIG. 2) of memory 214 are aggregated together in a common database. In a manner described above, images are downloaded from each one of the digital cameras 402 into the image database 140. Also, the event bookmarks residing in the event bookmark memory 410 are downloaded into the image data manager 412, via connection 414. Elements residing in the image data manager 412 bearing the same reference numerals as the image data manager 122 (FIG. 1) are preferably substantially similar to each other.

With this embodiment, the image data processor 130 executes the bookmark intelligence 414 to associate the event bookmarks and time stamps with various event occurrences in the event. The image data manager 412 correlates the time stamps associated with the event bookmarks with the time stamps associated with the images residing in the image database 140. In one embodiment, the operator designates the time stamp associated with the first event bookmark as a reference time. Then, the operator of the image data manager 412 associates the time stamp of the first image received from each one of the plurality of digital cameras 402 with the time stamp of the first event bookmark. Once the time stamps have been associated, image data processor 130 executes the bookmark intelligence 414 to associate the event bookmarks with the image information residing in image database 140 by the correlation of the time stamps with each other.

The above-described embodiment of the event bookmark recorder 408 is particularly advantageous for event bookmarking at an event wherein the digital cameras 402 do not have signal transceivers or the like, but do have internal clocks. Thus, the bookmark intelligence 414 is adapted to interpret a plurality of incoming images in a variety of formats. Such a feature is particularly desirable when the digital cameras 402 are produced by different vendors that employ different digital image data formats and clock time stamp formats.

Figure 5:
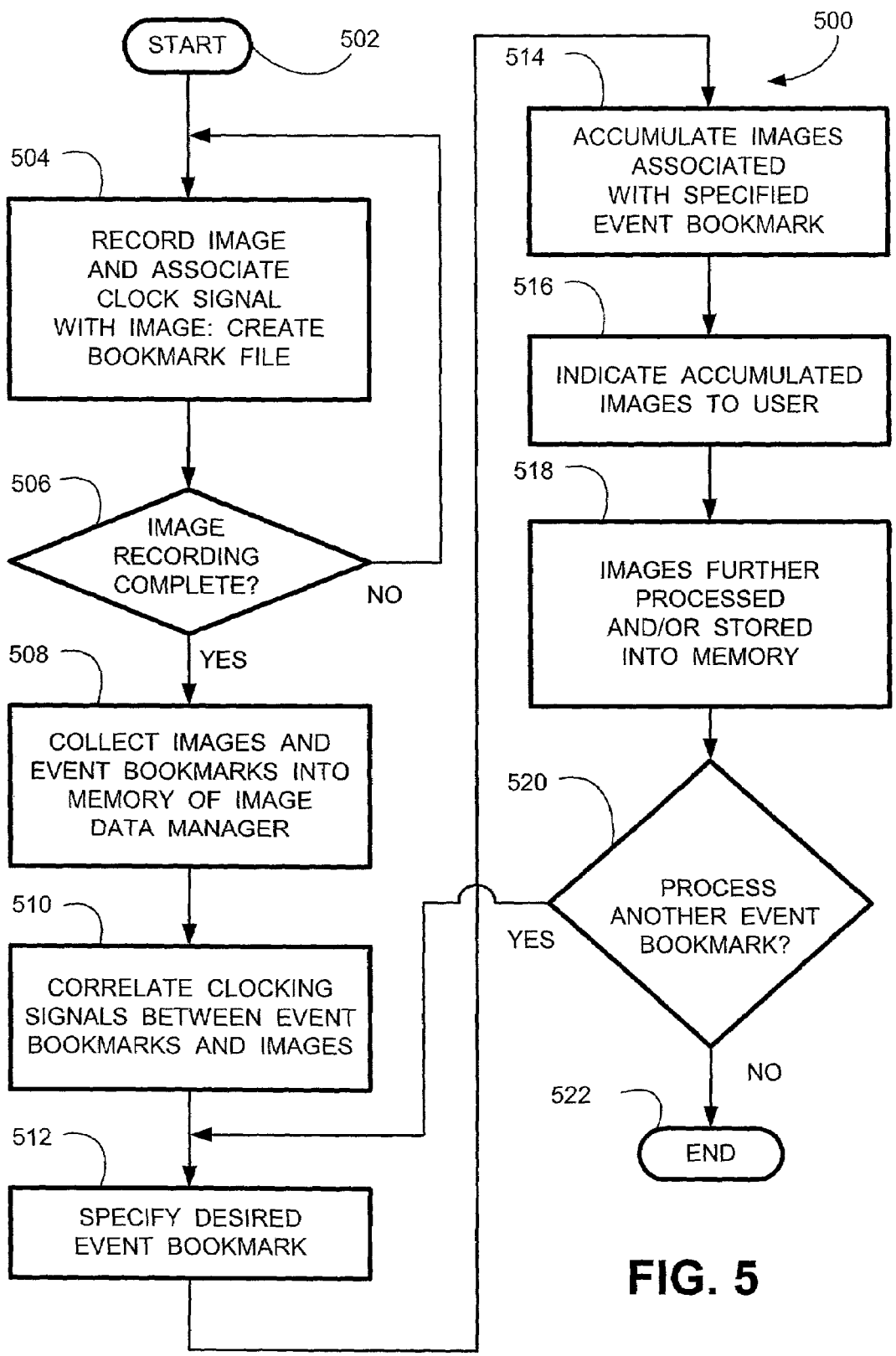
FIG. 5 is a flow chart illustrating an alternative process of capturing and event bookmarking a plurality of images, and the subsequent processing of the images, all according to the present invention.

FIG. 5 is a flow chart 500, according to the present invention, illustrating an embodiment of a process of event bookmarking a plurality of images using the digital cameras 402 (FIG. 4), and the subsequent processing of the images by the image data manager 122 that employs the bookmark intelligence 414 (FIG. 4). The flow chart 500 of FIG. 5 also shows the architecture, functionality and operation of a possible embodiment of the software for implementing image data processing logic 142, and the associated bookmark intelligence 414. In this regard, each block may represent a module, segment or portion of code, which comprises one or more executable instructions for implementing the specific logical function(s). It should also be noted that in some alternative implementations, the functions noted in the blocks may occur out of the order noted in FIG. 5 or may include additional functions without departing from the functionality of the event broadcast and image data manager system 400. For example, two blocks shown in succession in FIG. 5 may in fact be executed substantially concurrently, the blocks may sometimes be executed in the reverse order, or some of the blocks may not be executed in all instances, depending upon the functionality of the embodiment involved, as will be further clarified herein below. All such modifications and variations are intended to be within the scope of the present invention.

The process of practicing the event broadcast and image data manager system 400 (FIG. 4), starts at block 502. At block 504, the digital camera 402 captures images and associates time stamps based upon clock 406 with each captured image. Concurrently, the event bookmark recorder 408, in response to prompts form the operator of the event bookmark recorder 408, generates and saves event bookmarks having at least time or clock information.

At block 506, a determination is made whether the image capturing session has been completed. That is, has the event concluded such that the individuals are no longer capturing images with at least one of the digital cameras 402? Or, are the individuals done capturing images at the event although the event has not yet concluded? The cameras according to the present invention in one embodiment provide an indication signal indicating that the camera is no longer operating and/or receiving bookmark signals. For example, the camera may be turned off, the camera shutter cover may be closed, or a suitable switching device may be actuated by the individual using the digital camera. Alternatively, the individuals at the event may understand that the image capturing session has been completed such that the process proceeds to block 508. Here, the operator of the event bookmark recorder 408 would then stop the generation of event bookmarks.

If the image capturing session has been completed (the YES condition), the process proceeds to block 508. At block 508 images are collected into the image database 140 (FIG. 4) of memory 134. Also, event bookmarks are collected into the image database 140 or into another suitable memory.

If one or more of the individuals are still capturing images at the event, or if the event is not over (the NO condition of block 506), the process returns to block 504 so that the individual(s) may continue capturing images with digital cameras 402 and the operator of the event bookmark recorder 408 may continue the generation and storing of event bookmarks.

At block 510, in response to prompts from the operator, the image data manager 412 causes the image data processor 130 to execute the bookmark intelligence 414 to correlate the clocking signal of the event bookmarks with the clocking signals associated with the images. Thus, the image information is bookmarked with the event bookmarks. At block 512, a desired event bookmark is specified to the image data processor 130. Then, at block 514, the image data processor 130 executes the image data processing logic 142 to accumulate images associated with the specified event bookmark. At block 516, image data manager 122 indicates which images have been collected according to the specified event bookmark. At block 518, in response to directions provided by the operator, further processing of the accumulated images is performed and/or images associated with the specified bookmark are stored, as desired, back into memory. At block 520, it is determined whether the image data manager 122 is to process additional images residing in the image database 140. If so (the YES condition) another event bookmark is specified and the process proceeds to block 512. If no further event bookmark is to be processed (the NO condition), the process ends at block 522.

An alternative embodiment of an image data manager according to the present invention provides for the subsequent modification of the event bookmark after the image information has been downloaded into the image database 140. Image data processing logic 142 would be configured to allow the operator of the image data manager to access an event bookmark, and then allow the operator to modify the event bookmark information, add to the event bookmark information and/or delete information from the event bookmark. Furthermore, the image data processing logic 142 may be further modified to enable the operator to add new event bookmarks to selected images. Such an alternative embodiment of the image data manager is particularly advantageous when the operator wishes to amend or add additional detail to the event bookmark information of selected images, or if the operator wishes to add a bookmark to a digital still or video image that may not have been captured at the event itself. For example, but not limited to, the individual preparing a wedding album may desire to incorporate scenic pictures of the locale of the wedding. Also, images captured by a digital image capturing device that is not configured to operate in accordance with the present invention may be event bookmarked. For example, but not limited to, the individual preparing a wedding album may desire to incorporate a photograph captured on film that has been digitized into a digital data format. Such images would be retrieved from a different resource, such as, but not limited to, a database of other images, and downloaded into the image database 140. The operator of the image data manager 122 could then bookmark the image with an existing event bookmarker, or alternatively, bookmark the image with a new event bookmark.

An alternative embodiment of the image data manager comprises both the bookmark intelligence 414 (FIG. 4) and the bookmark intelligence 144 (FIG. 1) in memory 134 (FIGS. 1 and 4). Thus, such an image data manager is configured to correlate event bookmarks with images when the bookmarks are received separately from the event bookmark recorder 408 and/or when the bookmarks have been associated with the incoming image information. Such an alternative embodiment is particularly suitable for environments wherein a plurality of event broadcasters 120 and/or a plurality of event bookmark recorders 408 are rented or sold to a plurality of customers, who then later return to the operator of the image data manager for the processing of their images.

Furthermore, another embodiment employs a combined unit, which comprises the components of the event broadcaster 120 (FIG. 1) and the event bookmark recorder 408 (FIG. 4). With this embodiment, the operator of the combined event broadcaster and event bookmark recorder may transmit event bookmarks out to digital cameras 124 (FIGS. 1 and 2) that are adapted to receive broadcast event bookmarks. For other cameras, such as digital cameras 402 (FIG. 4), the event bookmarks are stored in the event bookmark memory 410 (FIG. 4). When images from digital cameras 402 that are not adapted to receive broadcasted event bookmarks are included in the image processing function, the event bookmark may be correlated with the images by referencing the time of the bookmark with the time stamps associated with each image that was captured by digital cameras 402.

Now, therefore, the following is claimed:

1. A system which receives event bookmarks comprising:
an image capture device that captures at least one image of an event;
a transceiver residing in the image capture device and configured to receive an event bookmark broadcasted by an event bookmark broadcaster; and
a processing device located in the event bookmark broadcaster and configured to associate the received event bookmark with the captured image and with information corresponding to a time at which the image is captured in relation to the event, such that the captured image is ordered in a time sequence with a plurality of other images captured by other image capture devices, the plurality of other images associated with the received event bookmark.

2. The system of claim 1, the processing device further comprising a processor configured to execute logic such that the received event bookmark is associated with the at least one captured image.

3. The system of claim 1, further comprising a memory residing in the image capture device, the memory configured to store the received event bookmark such that the event bookmark is associated with at least one subsequently captured image.

4. The system of claim 3, further comprising a clock residing in the image capture device, the clock configured to generate a time stamp such that the time stamp is associated with the at least one subsequently captured image and the event bookmark.

5. The system of claim 4, wherein the time stamp corresponds to a period of time between image capture and receipt of the event bookmark.

6. The system of claim 1, further comprising an antennae coupled to the transceiver and configured to detect radio frequency (RF) signals having the event bookmark.

7. The system of claim 1, further comprising an optical sensor coupled to the transceiver and configured to detect optical signals having the event bookmark.

8. The system of claim 1, further comprising an infrared sensor coupled to the transceiver and configured to detect infrared signals having the event bookmark.

9. The system of claim 1, wherein the received event bookmark comprises a time stamp that corresponds to a time that the event bookmark was broadcast to the image capture device.

10. The system of claim 9, further comprising a clocking device that generates another time stamp such that the captured image is further ordered in a time sequence with the plurality of other images captured based upon the received event bookmark time stamp and the clocking device time stamp.

11. The system of claim 1, wherein the received event bookmark comprises meta-data that corresponds to a predefined occurrence in the event, such that the captured image is further ordered in a time sequence with the plurality of other images captured based upon the predefined occurrence in the event.

12. A method for receiving event bookmarks, the method comprising to steps of:
    detecting an event bookmark broadcasted from an event bookmark broadcaster;
    capturing en image of interest with an image capture device;
    associating the captured image of interest with the detected event bookmark and with information corresponding to a time at which the image is captured in relation to the event, such that the captured image is ordered in a time sequence with a plurality of other images captured by other image capture devices, the plurality of other images associated with the received event bookmark; and
    activating, by an operator, the event bookmark broadcaster to broadcast the event bookmark to the image capture device.

13. The method of claim 12, further comprising the step of storing the event bookmark in a memory such that the event bookmark is associated with at least one subsequently captured image of interest.

14. The method of claim 12, further comprising the steps of: generating a time stamp; and
    associating the time stamp with the captured image of interest and the event bookmark.

15. The method of claim 14, wherein the time stamp corresponds to a period of time between image capture and receipt of the event bookmark.

16. The method of claim 12, further comprising the step of communicating the captured image of interest and the associated event bookmark to an image data manager.

17. The method of claim 12, further comprising the step of detecting an event bookmark comprising a time stamp that corresponds to a time that the event bookmark was broadcast to the image capture device.

18. The method of claim 17, further comprising the step of generating a clocking device time stamp such that the captured image is further ordered in a time sequence with the plurality of other images captured based upon the received event bookmark time stamp and the clocking device time stamp.

19. The method of claim 12, further comprising the step of detecting an event bookmark comprising meta-data that corresponds to a predefined occurrence in the event, such that the captured image is further ordered in a time sequence with the plurality of other images captured based upon the predefined occurrence in the event.

20. A computer readable medium having a computer program for associating an event bookmark with a captured image, the program comprising logic configured to perform the steps of receiving an event bookmark, receiving a captured image of interest from an image capture device, associating the captured image of interest wit the received event bookmark, the received event bookmark including (1) a phrase that describes the captured image and (2) a time stamp corresponding to a time an operator broadcasts the event bookmark to the image capture device, and storing the captured image of interest and the associated event bookmark in a memory.

21. The computer readable medium of claim 20, the logic further configured to perform the steps of:
    storing In the memory a most recently received event bookmark; and
    retrieving the most recently received event bookmark from the memory in response to the step of receiving the captured image, such that the most recently received event bookmark is associated with the received captured image of interest.

22. A system which receives event bookmarks comprising:
    an image capture device that captures plural images of an event, the image capture device being portable and user activated to capture the images at different locations at the event;
    a transceiver residing in the image capture device and configured to receive an event bookmark broadcasted by an event bookmark broadcaster, the event bookmark comprising meta-data describing at least one predefined occurrence in the event; and
    a processing device configured to associate the received event bookmark with the captured images, such that the captured images are grouped with at least one other image captured at the event by at least one other image capture device, the grouping based upon the predefined occurrence in the event which is identifiable by the meta-data.

23. The system of claim 22, wherein the meta-data comprises descriptive information corresponding to the occurrence at the event.

24. The system of claim 22, wherein the meta-data comprises a sequence of alphanumeric characters, wherein one of the alphanumeric characters corresponds to the occurrence at the event.

25. The system of claim 22, wherein the meta-data comprises time information, wherein the time information permits identification of the occurrence at the event.

26. A method comprising:
broadcasting, upon actuation from an operator, an event bookmark to a portable image capture device;
receiving the event bookmark broadcasted from an event bookmark broadcaster, the event bookmark comprising meta-data that describes activities at an event;
capturing an image of interest at the event with the image capture device; and
associating the captured image of interest with the detected event bookmark, such that the captured image is grouped with at least one other image captured at the event by at least one other image capture device, the grouping based upon at least one predefined occurrence in the event which is identifiable by the meta-data.

27. The method of claim 26, further comprising:
storing in the memory a most recently received event bookmark; and
retrieving a most recently received event bookmark from the memory in response to the step of receiving the captured image, such that the meta-data of the most recently received event bookmark is associated with the received captured image of interest.

28. The method of claim 26, further comprising:
storing the event bookmark in a memory residing in the image capture device;
capturing a second image of interest with an image capture device; and
retrieving the event bookmark from the memory in response to the step of capturing the second captured image, such that the meta-data of the second image is associated with the second captured image, such that the second image is grouped with the previously captured image and the other image captured at the event by the other image capture device.

29. The method of claim 26, further comprising:
receiving a second event bookmark broadcasted from an event bookmark broadcaster, the event bookmark comprising second meta-data
capturing a second image of interest with an image capture device; and
associating the second captured image of interest with the detected second event bookmark, such that the captured image is grouped with another image captured at the event by the other image capture device, the second grouping based upon a second predefined occurrence in the event which is identifiable by the second meta-data.

* * * * *

UNITED STATES PATENT AND TRADEMARK OFFICE
CERTIFICATE OF CORRECTION

PATENT NO. : 7,102,670 B2 Page 1 of 1
APPLICATION NO. : 10/001585
DATED : September 5, 2006
INVENTOR(S) : Mark D. Seaman et al.

It is certified that error appears in the above-identified patent and that said Letters Patent is hereby corrected as shown below:

In column 17, line 44, in Claim 12, delete "to" and insert -- the --, therefor.

In column 17, line 47, in Claim 12, delete "en" and insert -- an --, therefor.

In column 18, line 30, in Claim 20, delete "wit" and insert -- with --, therefor.

In column 18, line 39, in Claim 21, delete "In" and insert -- in --, therefor.

Signed and Sealed this

Fifth Day of May, 2009

JOHN DOLL
*Acting Director of the United States Patent and Trademark Office*